(12) United States Patent
Murray et al.

(10) Patent No.: US 6,546,101 B1
(45) Date of Patent: Apr. 8, 2003

(54) COMMUNICATION DEVICE HAVING ILLUMINATED AUDIO INDICATOR

(75) Inventors: Thomas A. Murray, Plantation, FL (US); Ryan M. Nilsen, Sunrise, FL (US); Michael R. Gardner, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 449 days.

(21) Appl. No.: 09/584,982

(22) Filed: Jun. 2, 2000

(51) Int. Cl.⁷ ................................................ H04M 1/00
(52) U.S. Cl. .............................. 379/433.02; 379/433.04
(58) Field of Search ..................... 379/433.01, 433.02, 379/433.04, 433.07; 455/575, 90

(56) References Cited

U.S. PATENT DOCUMENTS 5,608,794 A  *  3/1997  Larson ........................ 379/430

* cited by examiner

*Primary Examiner*—Jack Chiang
(74) *Attorney, Agent, or Firm*—Scott M. Garrett

(57) ABSTRACT

A radio (100) provides multiple audio modes of operation, such as a cellular and dispatch modes. Illumination devices (108, 110) are located near the radio's audio sources (104, 106) and become activated to indicate to the user which mode of operation is present.

4 Claims, 3 Drawing Sheets

COMMUNICATION DEVICE HAVING ILLUMINATED AUDIO INDICATOR

TECHNICAL FIELD

This invention relates in general to portable communication devices and more particularly to those devices having multiple audio communications modes.

BACKGROUND

Portable communication devices, such as cellular phones and two-way radios, are increasing in popularity. A vast array of such devices along with a variety of services are now available to the consumer. The user interface and ergonomics used in handheld devices often dictates whether a consumer will purchase one product over another. Some radios, such as the iDEN® radios manufactured by Motorola, Inc., incorporate both cellular and dispatch (two-way) modes of operation to provide the user with the option of using either duplex communications through the cellular mode or simplex communications through the dispatch mode.

Some radios offer both dispatch and cellular through the use of two separate speakers (transducers), one for each mode of operation. Other radios port the audio through a single speaker by internally switching between dispatch and cellular operating modes. When utilizing the single speaker approach, the audio level ported through the speaker needs to be adjusted for each mode of operation. A lower audio level is typically used for the cellular mode where the user typically holds the radio next to the ear, and a higher audio level is used for the dispatch mode where the user holds the radio in front of the face.

Though the radio mode of operation and volume level can be displayed on a radio display, users who suffer from certain types of visual impairment may not be able to readily distinguish which type of call is coming in. Thus, a user may inadvertently place a dispatch call up near the ear or a cellular call away from the ear.

Accordingly, it would be greatly beneficial to have an easy, quick indication means that would allow a user to visually discriminate between multiple communication modes in a portable radio. Such an indicator would minimize the occurrence of missed calls. Even phones that have only one mode of operation could benefit from an indicator that could visually indicate when a phone has audio present at the speaker.

DETAILED DESCRIPTION OF THE PREFERRED EMBODIMENT

Figure 1:
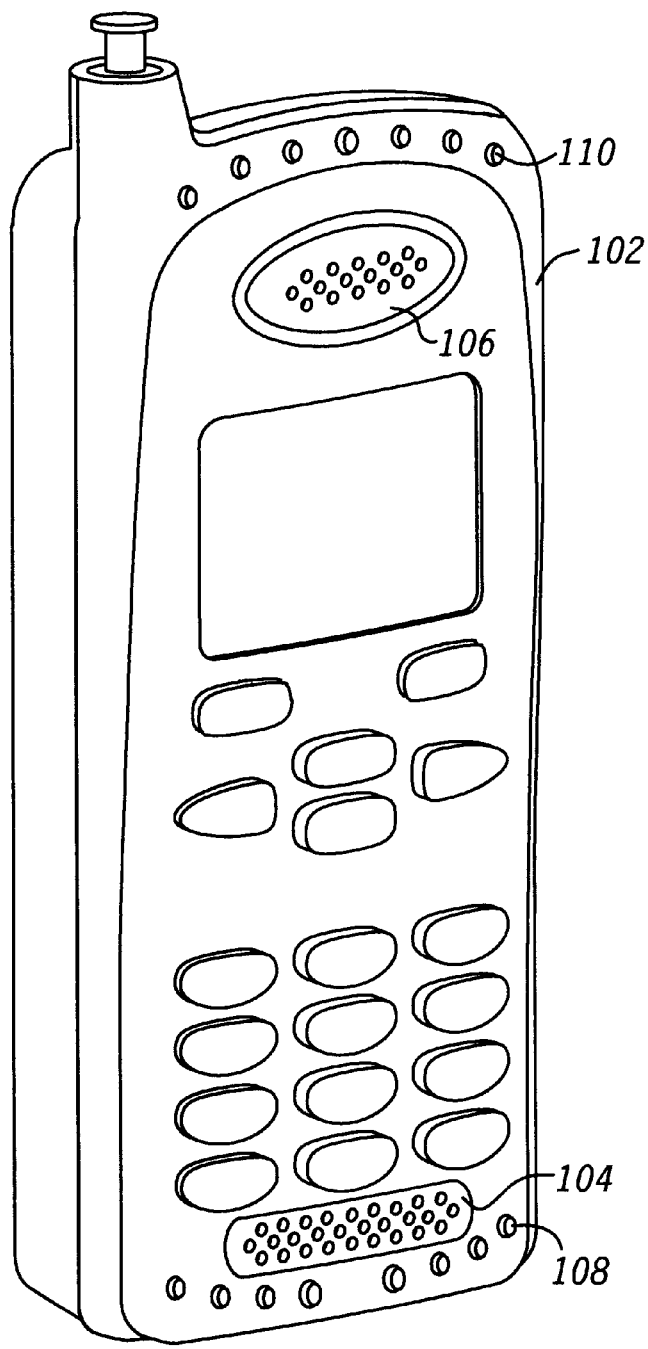
FIG. 1 is a multi mode radio having dual speakers utilizing an audio illumination indicator in accordance with a first embodiment of the invention.

Referring to FIG. 1, there is shown a radio 100, in accordance with a first embodiment of the invention. The radio 100 preferably provides multiple modes of communication operation, such as dispatch mode of operation and a cellular mode of operation. Housing 102 includes a first speaker located behind a first speaker grill 104 for handling the dispatch mode of operation. Housing 102 further includes a second speaker located behind a second speaker grill 106 for handling the cellular mode of operation. In accordance with the preferred embodiment of the invention, housing 102 includes a first light source 108 proximately located to the first speaker grill 104 for indicating when the dispatch mode of operation is active, and further includes a second light source 110 proximately located to the second speaker grill 106 for indicating when the cellular mode of operation is active.

In accordance with the first embodiment, one or more light sources is proximately coupled to each speaker grill 104, 106 to indicate the audio source in a multi mode radio. A variety of illumination devices can be used to provide the light sources such as light emitting diodes (LEDs), electro luminescent (EL) panels, and many other sources known in the art. The light sources are preferably located behind the speaker grill in close proximity to the speaker. Alternatively, many of today's speaker cones are made of clear plastic thus allowing the light source to be located directly behind the speaker cone itself and yet still shine through the speaker grill.

In addition to indicating the mode of operation, the light sources 108, 110 can also provide further indicators as to volume level and audio frequency response. For example, the light sources 108, 110 can vary with loudness by either changing the illumination intensity or by increasing/decreasing the number of lights in a bar panel or gradient. A variety of different colored light sources or blinking lights can be used to indicate an operating mode or vary with respect to volume or audio frequency.

The illuminated audio indicator 108, 110 of the present invention provides a useful visual indication of the audio source in a multi mode communication device. Users can pick up the device and readily distinguish between at least two modes of operation.

Figure 2:
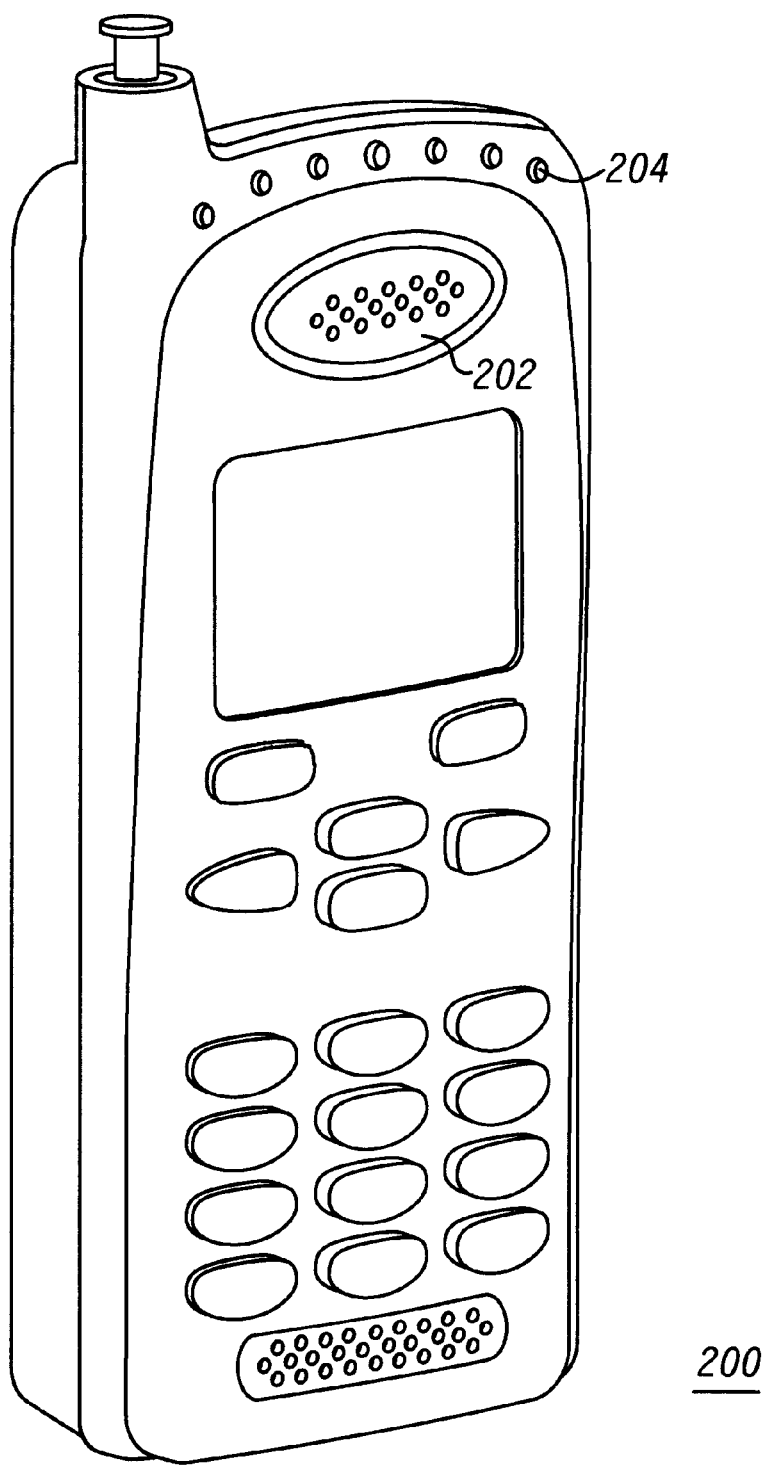
FIG. 2 is a multi mode radio having a single speaker utilizing the audio illumination indicator in accordance with a second embodiment of the invention.

Though the first embodiment describes a dual speaker radio 100, the illuminated audio indicator of the present invention also has applications in communications devices that provide multi mode operation using a single speaker. FIG. 2 shows a radio 200 having a single speaker coupled behind a speaker grill 202 in accordance with a second embodiment of the invention. A radio that provides, for example, both dispatch and cellular modes through a single speaker can now, in accordance with the present invention, utilize one or several light sources 204 to indicate which mode of audio communication is present at the speaker grill 202. Here again variations in light intensity, color, and number of lights can provide further information as to volume and audio frequency. Illuminating the speaker grill 202 provides a visual indication to the user that audio is present at the speaker. A person who has been placed on hold no longer has to keep the phone next to the ear waiting for the call, but rather can put the phone down, freeing their hands, until the speaker grill is illuminated indicating that audio is present again.

Figure 3:
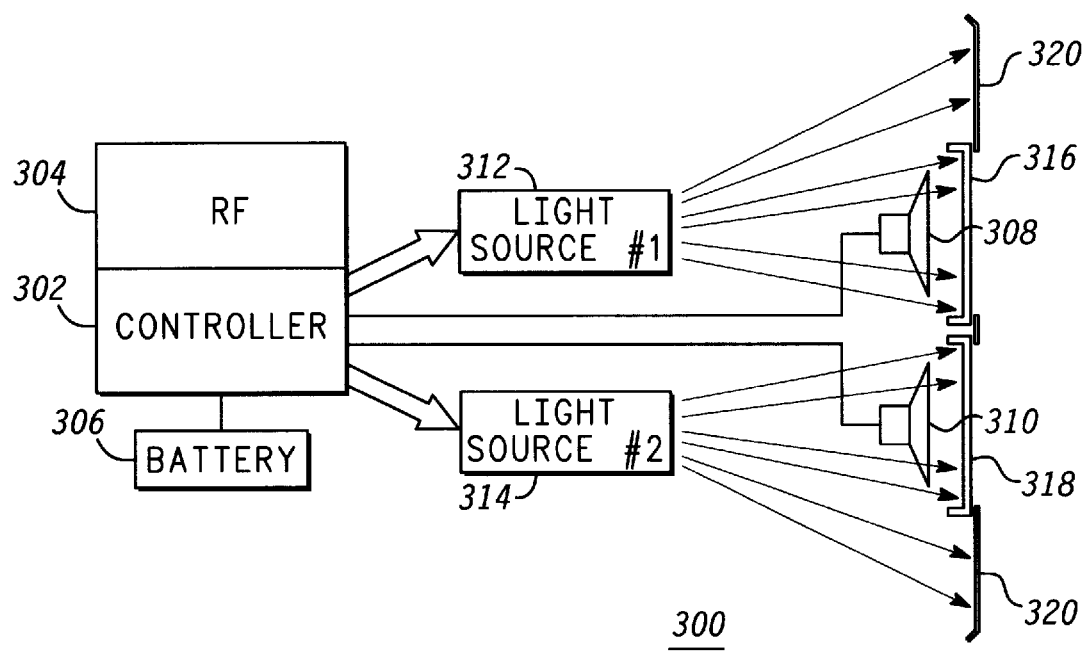
FIG. 3 shows a block diagram of a multi-code radio.

FIG. 3 shows a block diagram of a multi-mode radio 300 in accordance with the present invention. Radio 300 includes a controller 302 and radio frequency (RF) portion 304 powered by a battery 306. Controller 302 controls the audio going to first and second speaker cones 308, 310 used for various radio modes, such as dispatch, cellular, and speaker-phone. Alternatively, a single speaker cone could be used, as previously described, to accommodate multi mode operation. In accordance with the present invention, a light source, here shown as first and second light sources 312, 314, are located in proximity to the speaker cones 308, 310, such as behind the speaker cones or behind or next to the first and second speaker grills 316, 318 and/or housing 320. The location of the light source is chosen to give the user a visual indicator of the audio source. The controller 302 controls the parameters of the light source(s) that are being used as indicators. For example, variations in the light source intensity, intermittent or periodic blinking, time out timing, and variations in color can all be used as visual indicators for audio volume and frequency.

The audio illumination indicator (108, 110), (204) of the present invention allows a user to easily identify and locate the audio source on a portable handset. The user can readily distinguish between dispatch and cellular calls on dual mode radios which minimizes the occurrences of missed calls. The audio illumination indicator of the present invention not only indicates an incoming call but can provide a variety of indices throughout the call. For example, by maintaining the illumination throughout the call in dispatch mode, the user is provided with the benefit of volume and frequency indicators throughout the call. In multi mode radios that use a single speaker the audio illumination indicator of the present invention allows users to identify the type of incoming call and make appropriate volume adjustments. For example, a series of yellow lights might indicate that a dispatch call is coming in at a certain volume level so that the user will hold the device face forward, while a row of blue lights might indicate that a cellular call is coming in at a particular volume level so that the user will hold the earpiece next to the ear.

In accordance with the present invention, illumination of the speaker grill provides a visual indication to the user that audio is present at the speaker thereby facilitating the user interface. Users unfamiliar with using multi-mode phones will find the illumination feature provides improved recognition as to the type of mode within which the phone is operating.

Numerous modifications, changes, variations, substitutions and equivalents will occur to those skilled in the art without departing from the spirit and scope of the present invention as defined by the appended claims.

What is claimed is:

1. A phone, including:

an earpiece for transmitting audio;

a speaker grill coupled to the ear piece; and an illumination device for illuminating the speaker grill when audio is present at the ear piece.

2. The phone of claim 1, wherein the illumination device is coupled behind the speaker grill.

3. The phone of claim 1, wherein the illumination device varies in color with respect to variances in audio frequency.

4. The phone of claim 1, wherein the illumination device varies in intensity with respect to audio loudness.

* * * * *